April 21, 1964
H. C. BLAKE
3,130,280
ARTICLE SENSING DEVICE FOR AN ARTICLE SUPPORTING CHUTE
Filed Oct. 3, 1960
2 Sheets-Sheet 1
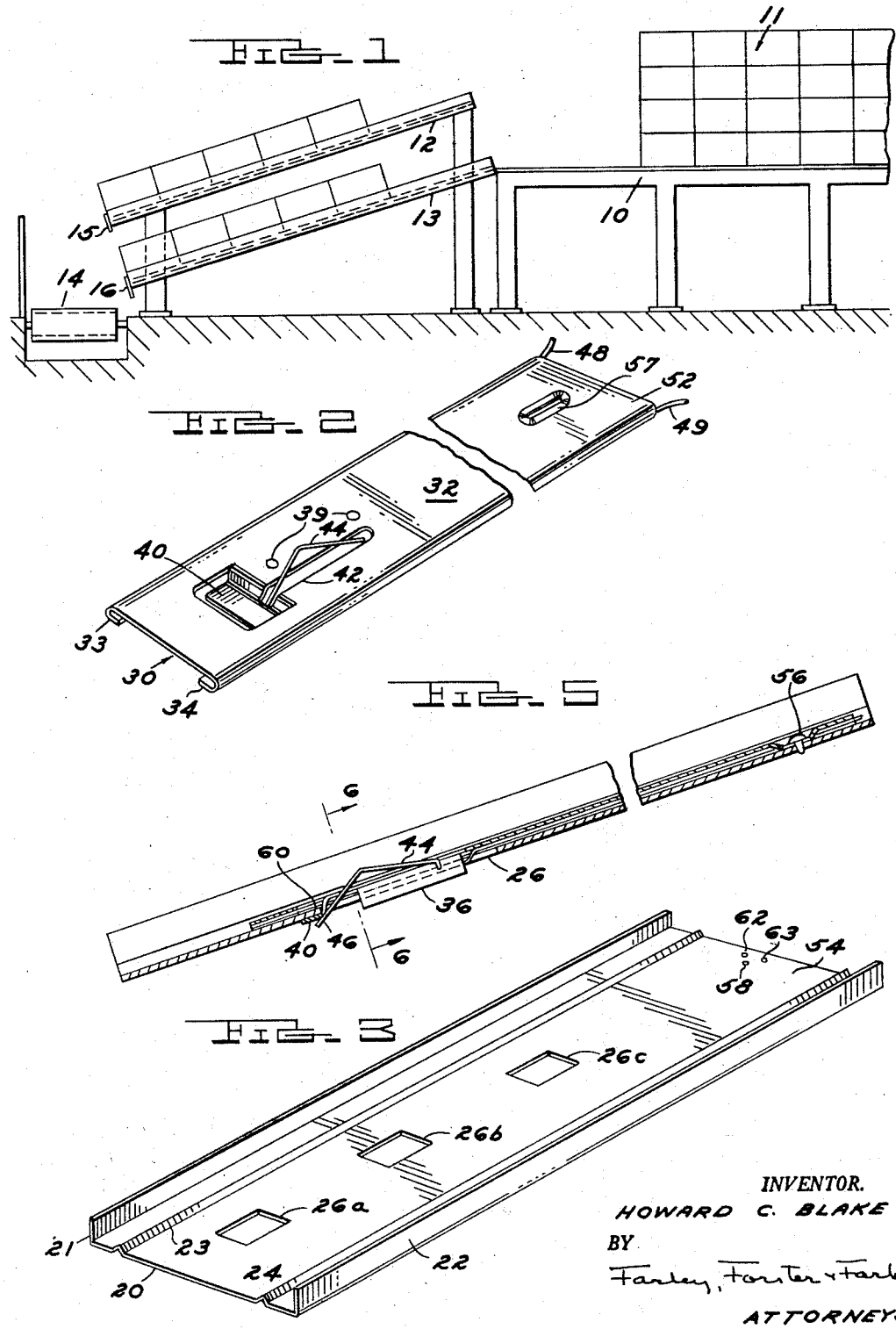
INVENTOR.
HOWARD C. BLAKE
BY
Farley, Forster & Farley
ATTORNEYS April 21, 1964            H. C. BLAKE            3,130,280
ARTICLE SENSING DEVICE FOR AN ARTICLE SUPPORTING CHUTE
Filed Oct. 3, 1960            2 Sheets-Sheet 2
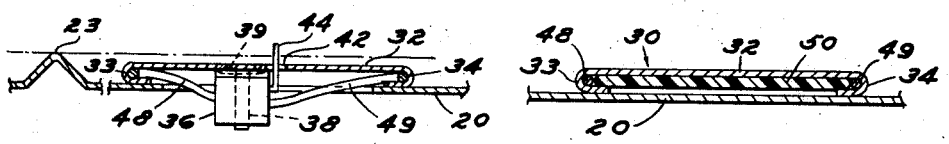
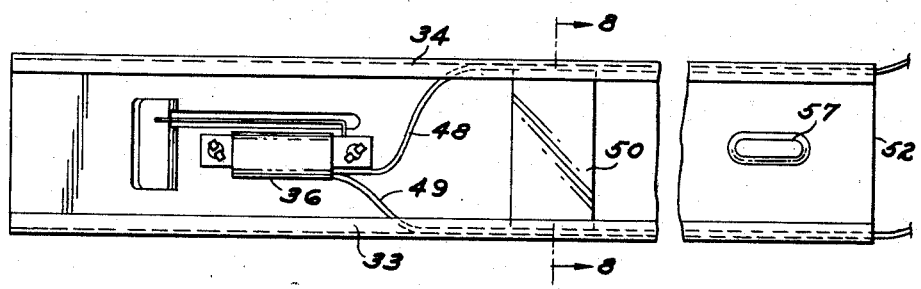
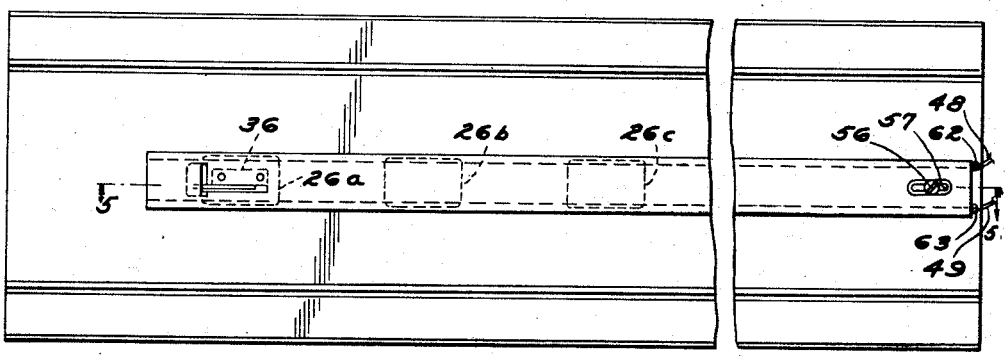
INVENTOR.
HOWARD C. BLAKE
BY
Farley, Forster & Farley
ATTORNEYS

United States Patent Office 3,130,280
Patented Apr. 21, 1964

3,130,280
ARTICLE SENSING DEVICE FOR AN ARTICLE SUPPORTING CHUTE
Howard C. Blake, Oak Park, Mich., assignor to Admos, Inc., Warren, Mich., a corporation of Delaware
Filed Oct. 3, 1960, Ser. No. 60,109
5 Claims. (Cl. 200—61.41)

This invention relates to a device adapted to be installed on an article supporting chute such as is used in a warehouse installation for sensing the presence of an article on such a chute. The sensing may, for example, be for the purpose of detecting the quantity of articles held in storage on the chute.

The type of warehouse installation with which the invention is particularly useful is one wherein a plurality of inclined chutes are employed, each chute serving to store a quantity of articles and automatically deliver them to the lower discharge end of the chute for release as required. Each chute of such an installation is ordinarily provided with some kind of sensing device, such as a limit switch, which is mounted so that its actuating element projects into the path of movement of an article along the chute at some location intermediate the chute end. When the actuating element is not engaged by an article, a signal results indicating that the supply of articles on the chute is low and needs replenishing.

The chutes in such an installation are normally installed in rows and in tiers, sometimes with relatively little vertical spacing between tiers, and this makes it difficult to install limit switches intermediate the chute ends. It is not practical to assemble a limit switch to a chute before the chute is positioned on its mounting structure because of the likelihood of damage to the switch during the mounting of the chute. Furthermore, it frequently becomes necessary to change the location of a limit switch along the chute after the installation has been erected and put into operation, either because of a change in the article being handled on the chute, or a change in the demand for a particular article being handled on the chute.

The present invention provides a device which enables a sensing unit such as a limit switch to be readily installed on a chute at any desired location intermediate the ends thereof, and to be readily removed from the chute at any time for servicing, replacement, or relocation of the sensing unit. The use of the device of the invention results in a great savings in the cost of installing and maintaining sensing units on the chutes of a warehouse installation.

Essentially the device of the invention consists of an elongated member whose length is at least sufficient to extend from adjacent one end of a chute to the desired location of the sensing unit on the chute, a sensing unit mounted on the elongated member in depending relation therewith, this sensing unit being of the type such as a limit switch which produces an electrical signal on movement of an actuating element which forms part of the unit, and suitable means for detachably mounting the elongated member on the chute so that the actuating element of the sensing unit will be engaged by an article at the location desired, and so that the elongated member can be removed or installed from one end of the chute. Electrical connections to the sensing unit are mounted on the elongated member and extend along it from the location of the sensing unit to the end which is to be positioned adjacent the end of a chute.

Other preferred features of the device of the invention consist of a means of mounting the elongated member on the chute which involves merely providing an aperture in an inclined chute surface at the desired sensing unit location, this aperture being sufficiently large to receive the depending sensing unit secured to the elongated member, so that the elongated member can be supported upon this inclined chute surface with the sensing unit projecting through the aperture. The elongated member preferably is provided with a depending tang which will project through the aperture also and be engageable in overlapping relation with one end of the aperture, thereby forming a means for detachably securing the member to the chute by relative movement therebetween.

Another preferred feature is to form the elongated member from a strip of sheet material which is bent to form inwardly turned depending flanges along the sides thereof. These flanges serve as conduits within which the wires leading to the sensing unit may be mounted and held in place by resilient clips and also serves to space the upper surface of the elongated member above the surface of the chute on which it is supported. This surface of elongated member may then be employed, when the member is installed on a chute, as a runner or article contacting surface of limited area.

For a sensing unit such as a limit switch having an actuating arm projecting therefrom, the invention provides an improved mounting with relation to a surface along which an article moves, consisting of suitable means for mounting the limit switch below such surface and providing a slot cut through the surface adjacent the limit switch, the slot having a length less than that of the limit switch actuating arm which is then shaped to extend through the slot above the surface and then reverse direction to extend back through the slot below the surface to place the free end of the arm below the surface where it cannot be engaged by the end of an article.

Other features and advantages of the invention will appear from the following description of a presently preferred embodiment thereof as illustrated in the accompanying drawings which comprise the following views.

FIGURE 1, an elevation showing a representative warehouse installation employing chutes arranged in rows and tiers;

FIGURE 2, a perspective view of the device of the invention;

FIGURE 3, a perspective view of a chute on which the device of FIGURE 2 is to be installed;

FIGURE 4, a plan view of the chute of FIGURE 3 with the device of FIGURE 2 installed thereon;

FIGURE 5, a sectional elevation showing the device installed on a chute as indicated by the line 5—5 of FIGURE 4;

FIGURE 6, an enlarged sectional elevation taken as indicated by the line 6—6 of FIGURE 5;

FIGURE 7, a plan view of the device of the invention showing the underside thereof; and FIGURE 8, a sectional elevation taken as indicated by the line 8—8 of FIGURE 7 and including an inclined surface of a chute on which the device is resting.

FIGURE 1 has been included to briefly illustrate the background of the present invention. A typical warehouse installation is shown, consisting of an elevated platform 10 for the storage of a reserve bank of articles 11. Upper and lower rows of chutes 12 and 13 are shown at one side of the platform 10, being inclined downwardly to deliver articles supported thereon to a conveyor 14, the delivery being controlled by suitable release mechanisms 15 and 16 at the discharge ends of the chutes 12 and 13. The number of chutes in such an installation may run into the hundreds, depending upon the number of different types of articles being handled in the warehouse. Usually, one chute is employed for each particular type of article, although for an article in great demand, a group of chutes may be employed. With this many chutes being serviced from the reserve bank of articles 11, it becomes necessary to provide some means of indicating when the supply of articles on each chute reaches a certain low level. A limit switch placed somewhere between the ends of a chute has been employed for this purpose, the location depending upon the size of each article and the average demand for it.

A preferred form for an individual chute is shown in perspective in FIGURE 3, this chute 20 having the usual side rails 21 and 22, and being provided with a pair of article contacting runners 23 and 24 to control the rate of movement of a given article on a given incline as taught in the copending application of James F. McClelland, Jr., now U.S. Patent No. 3,064,783. The chute 20 is also provided with one or more apertures 26a, 26b and 26c cut in the inclined surface thereof and defining alternate locations for an article sensing unit or limit switch.

It can readily be appreciated from FIG. 1 that the task of installing and wiring a limit switch at any one of these locations would be time consuming, that a limit switch could not be installed in advance because of the likelihood of damage thereto while the chute is being mounted on its supporting structure, and that if it ever became necessary to change the location of a limit switch, the operation would again be a time consuming one and would further effect the ability to use some chutes adjacent to the one being worked upon.

These difficulties are overcome and other advantages obtained as well by the device of the invention. The device, in the form shown in FIG. 2, consists simply in an elongated member 30, such as a strip of sheet metal, which is shaped to have a flat upper surface 32 and downwardly and inwardly turned flanges 33 and 34 along the sides thereof. This member 30 will have a length sufficient to extend from adjacent one end of the chute to at least the location desired for the article sensing unit, as defined by the location of one of the apertures 26a, 26b and 26c in the chute surface. If desired, the member 30 can be made to extend the entire length of the chute, but with a chute such as shown in FIG. 2 employing one or more articles supporting runners 23 and 24, the member 30 will ordinarily be made just long enough to extend from preferably the upper end of the chute to the desired sensing unit location.

A sensing unit such as the limit switch 36 is suitably secured to the member 30 in depending relation therewith as by pins 38 whose heads 39 are recessed within depressions formed in the flat upper surface 32 of the member so as to not project thereabove. A downwardly and longitudinally projecting tang 40 is struck from the surface 32 of the member 30, and a slot 42 is cut through the surface 32 adjacent the position of the limit switch 36. This slot 42 is adapted to receive the limit switch actuating arm 44 and is formed with a length less than that of the arm so that the latter can be bent from its normal straight shape to extend upwardly through the slot to a level above that of the surface 32 of the member 30 and then back downwardly through the slot so that the free end 46 of the arm is retained below the tang portion 40 of the member 30. Wiring connections 48 and 49 to the limit switch are routed through the side flanges 33 and 34 of the member 30 and extend to the end 52 thereof, this being the end which lies adjacent an end of a chute when the device is mounted thereon. The side flanges 33 and 34 serve as conduit means for the wires which are held therein by a suitable number of resilient clips 50 (FIGS. 7 and 8).

The foregoing elements, namely, the elongated member, the sensing unit and its actuating arm, and the wiring connections thereto, constitute a complete assembly which may be fabricated in the various lengths required for a particular chute installation and supplied along with a suitable number of spares. After the chutes have been erected, a device having a length suitable for each particular chute is selected and mounted thereon by some suitable means which in the construction shown consists simply in the inclined surface 54 of the chute itself, the tang 40 of the member 30 and an anchor screw 56 which extends through an elongated slot 57 at the end 52 of the member 30 and engages a hole 58 formed at one end of the chute. In order to assemble the device on a chute it is merely necessary to slide it down from the upper end of the chute until the limit switch reaches the aperture 26a, b or c in which it is to be located. The limit switch will fall through such aperture and then further downward movement of the member 30 will bring the tank 40 thereof into overlapping engagement with the end 60 of the aperture as shown in FIG. 5. Screw 56 is then installed and the wires 48 and 49 are fed through holes 62 and 63 in the chute as shown in FIGS. 2 and 4. All further connections between the sensing unit and circuits to any indicating devices can thus be completed at the end of the chute, further saving time and cost of installation.

In case of malfunction in a sensing unit, the device can be removed from the chute very simply and quickly and replaced with another device without affecting the operation of any adjacent chute. The same is true in case it becomes necessary to change the location of a sensing unit which merely requires the removal of one device and the replacement of it with a device having a different length so that the limit switch will be placed in one of the other apertures 26 of the chute.

A further advantage of the device is the fact that when installed on the inclined surface of a chute, the upper surface 32 of the device serves to limit the area of possible contact between an article and the chute. This feature may be used to supplement the limited area of contact provided by the article supporting runners 23 and 24, particularly for instances where packages with bulging or sagging bottoms are placed on the chute; or, this feature enables the device to be employed in lieu of one or both of the article supporting runners 23 and 24 so that the upper surface 32 of the device itself forms a means for changing or controlling the motion characteristics between an article and the chute as taught in the aforementioned patent of James F. McClelland, Jr.

Other features, advantages and possible modifications of the construction illustrated herein will appear to those skilled in the art and may be resorted to without departing from the scope of the invention as defined in the following claims.

1. In combination with an inclined article supporting chute, a device for detecting the presence of an article at some location intermediate the ends of said chute comprising an elongated member having a length sufficient to extend from adjacent one end of said chute at least to said location, a sensing unit such as a limit switch, means mounting said sensing unit on said elongated member for actuation from the upper side thereof at said location, said elongated member having downwardly turned side flanges, electrical wires leading to said limit switch, means mounting said wires between said side flanges, and means detachably mounting said elongated member on the upper surface of said chute including a connection between said member and said chute adjacent said one chute end whereby said member can be attached to said chute from said one chute end.

2. The combination set forth in claim 1 wherein said mounting means includes portions on said elongated member and on said chute overlapped by relative movement between said member and chute longitudinally of the latter.

3. In combination with an inclined article supporting chute having a plurality of article engaging runners projecting above the upper surface thereof and extending along the length thereof, a device for detecting the presence of an article at some location intermediate the ends of said chute comprising an elongated member having a length sufficient to extend from adjacent one end of said chute at least to said location and having a thickness not in excess of the height of said runners above said chute surface, an aperture formed in said chute surface at said location, a sensing unit such as a limit switch, means mounting said sensing unit on the underside of said member for actuation from the upper side thereof, and means mounting said member on the upper surface of said chute with one end of said member adjacent one end of the chute and with said sensing unit positioned in said aperture, said mounting means including a tang projecting from said member into said aperture and having a longitudinally extending portion adapted to be placed in overlapping engagement with the undersurface of said chute at one end of said aperture whereby said elongated member can be attached to said chute from said one chute end.

4. A sensing device according to claim 3 wherein said sensing unit is of the type having an actuating arm pivotally carried thereby, said sensing unit mounting means including a slot formed in said elongated member and extending longitudinally thereof in the plane of movement of said arm, said slot having a length less than the length of said arm and said arm being shaped to extend through said slot from the underside of said member, project above the upper side thereof and return through said slot to below the underside of said member.

5. A device for detecting the presence of an article at a location intermediate the ends of an inclined chute comprising a member having a length sufficient to extend along the surface of said chute from adjacent the upper end thereof at least to said location, said member comprising a strip of sheet material having a flat upper surface and a downwardly and inwardly extending flange formed along each side thereof, a sensing unit such as a limit switch having an actuating arm carried thereby, means mounting said sensing unit on said member below the said surface thereof, said sensing unit including a pair of wires electrically connected thereto, means mounting said wires on said member within the side flanges thereof and means for detachably securing said member to said chute with said sensing unit positioned at said location thereon.

References Cited in the file of this patent

UNITED STATES PATENTS

| | | |
|---|---|---|
| 993,460 | Rice | May 30, 1911 |
| 2,177,386 | Gearin | Oct. 24, 1939 |
| 2,575,847 | Skillman | Nov. 20, 1951 |
| 2,794,535 | Hauschild et al. | June 4, 1957 |
| 2,907,015 | Young | Sept. 29, 1959 |
| 2,911,509 | Millerwise | Nov. 3, 1959 |
| 3,016,123 | Wilcox | Jan. 9, 1962 |
| 3,069,570 | Abadie | Dec. 18, 1962 |